(12) United States Patent
Chaintreau

(10) Patent No.: US 8,509,084 B2
(45) Date of Patent: Aug. 13, 2013

(54) REPRESENTATION OF A DELAY PATH IN MOBILE NETWORKS

(75) Inventor: Augustin Chaintreau, Paris (FR)

(73) Assignee: Thomson Licensing (FR)

( * ) Notice: Subject to any disclaimer, the term of this patent is extended or adjusted under 35 U.S.C. 154(b) by 485 days.

(21) Appl. No.: 12/227,504

(22) PCT Filed: May 16, 2007

(86) PCT No.: PCT/FR2007/051289
§ 371 (c)(1),
(2), (4) Date: Nov. 19, 2008

(87) PCT Pub. No.: WO2007/135325
PCT Pub. Date: Nov. 29, 2007

(65) Prior Publication Data
US 2009/0175219 A1    Jul. 9, 2009

(30) Foreign Application Priority Data
May 22, 2006   (FR) ..................................... 06 04581

(51) Int. Cl.
*H04L 12/28* (2006.01)
(52) U.S. Cl.
USPC ......................................................... 370/236
(58) Field of Classification Search
USPC ................. 370/229, 235, 241, 248, 252, 351, 370/236, 389, 394, 412, 428, 429
See application file for complete search history.

(56) References Cited

U.S. PATENT DOCUMENTS

| | | |
|---|---|---|
| 5,412,654 A | 5/1995 | Perkins |
| 2002/0101869 A1 | 8/2002 | Garcia-Luna-Aceves et al. |
| 2003/0195995 A1* | 10/2003 | Tabbara ........................ 709/313 |
| 2004/0156345 A1 | 8/2004 | Steer et al. |
| 2005/0216182 A1* | 9/2005 | Hussain et al. ............... 701/200 |
| 2006/0007863 A1* | 1/2006 | Naghian ....................... 370/238 |
| 2006/0120396 A1* | 6/2006 | Hasegawa et al. ............ 370/432 |

FOREIGN PATENT DOCUMENTS

| | | |
|---|---|---|
| JP | 4341031 | 11/1992 |
| JP | 11032072 | 2/1999 |
| JP | 2001136178 | 5/2001 |
| JP | 2003198563 | 7/2003 |

OTHER PUBLICATIONS

Orda, Ariel et al., "Shortest-Path and Minimum-Delay Algorithms in Networks with Time-Dependent Edge-Length", Journal of the Association for Computing Machinery, vol. 37, No. 3, Jul. 1990, pp. 607-625.*
Search Report Dated Nov. 12, 2007.
Syrotiuk, V. "An Efficient On-Line Algorithm for the Shortest Mobile Path Problem" Proceedings of the 13th International Conference on Wireless Communications. Jul. 2001. p. 154. (Abstract Only).

* cited by examiner

*Primary Examiner* — Omar Ghowrwal
(74) *Attorney, Agent, or Firm* — Tutunjian & Bitetto, P.C.

(57) ABSTRACT

A communication device in a communication network and method for communicating between two or more different devices in the communication network. One implementation includes a means for storing for each (source, destination) pair of communication devices of the communication network, paths in the form of lists of (LD, EA) pairs, where EA is an earliest arrival time to a first communication device and LD is a last departure time from a second communication device for any sequence of contacts between pairs of communication devices linking the source communication device and the destination communication device. Data is transmitted to another communication device by a node selected using a history of observed previous observed paths.

11 Claims, 3 Drawing Sheets

$$\begin{cases} e_1 = (a, b, 1, 3) \\ e_2 = (b, c, 5, 7) \\ e_3 = (c, d, 2, 6) \\ e_4 = (d, e, 1, 8) \\ e_5 = (e, f, 3, 4) \end{cases}$$

REPRESENTATION OF A DELAY PATH IN MOBILE NETWORKS

This application claims the benefit, under 35 U.S.C. §365 of International Application PCT/FR2007/051289, filed May 16, 2007, which was published in accordance with PCT Article 21(2) on Nov. 29, 2007 in French and which claims the benefit of French patent application No. 0604581, filed on May 22, 2006.

SCOPE OF THE INVENTION

The present invention relates to the field of wireless networks.

The present invention relates more specifically to a communication device and to a method of communication between different devices.

PRIOR ART

The present invention falls within the scope of networks, for example ad-hoc wireless type or PAN (Personal Area Networks,) notably Bluetooth. The network is shown as a graph, in which a mobile terminal is a node (peak) of the graph, identified for example by a MAC address, in which the edges correspond to contacts between pairs of terminals, and in which a path is a sequence of chronologically ordered edges. Among all the possible paths, one is considered as optimal if, starting from a source at a given time, it reaches the destination at the earliest possible arrival date. For each (source, destination) pair, the arrival function gives, at each instant, the earliest arrival time for a created packet. A "naive" solution would consist in representing the observed time delays with a value for each instant. A calculation algorithm of the optimal path would update the set of values every time a new possible path is found. This solution is costly in space and operations.

The prior art already knows, through the scientific article "Shortest-Path and Minimum-Delay Algorithms in Networks with Time-Dependent Edge-Length" (A. Orda and R. Rom), a method to solve the problem of the shortest path in networks in which the delay (or weight) of edges changes with time according to random functions. The method according to the present invention is different insofar that it calculates the shortest path for all the sources at the same time.

The prior art also knows, through the scientific article "An efficient on-line algorithm for the shortest mobile path problem" (Syrotiuk, Abstract) a method to solve the problem of the shortest path in the network shown in the form of mobile graphs.

SUMMARY OF THE INVENTION

For any admissible sequence of contacts (a chronologically ordered path), the Earliest Arrival (EA) and the Last Departure (LD) are defined. The method according to the present invention builds arrival functions for all the (source, destination) pairs, by induction on the sets of contacts, or edges of the temporal graph. The functions are represented based on sets of (LD, EA) pairs. For each (source, destination) pair, it is possible to represent all the optimal paths by a list of (LD, EA) pairs.

The arrival process at each time (arrival function) is represented by a sequence of time-value pairs.

The present invention intends to overcome the disadvantages of the prior art by proposing a methodology to extract the optimal paths rapidly and efficiently.

For this purpose, the present invention relates to, in its most generally accepted sense, a communication device in a communication network comprising at least two communication devices, characterized in that it comprises means for:
 storing for each (source, destination) pair of network devices, paths in the form of lists of (LD, EA) pairs, EA being the Earliest Arrival and LD being the Last Departure, for any sequence of contacts between devices, and transmitting data to another device via a node selected using history of observed previous paths.

Preferably, said communication network is of packet-switching type, and the device comprises means for:
 creating, for the (source, destination) pairs of said network, functions that provide, at each time, the earliest arrival time for each created packet, and
 representing these functions based on the sets of (LD, EA) pairs.

According to a variant, said network is of PAN (Personal Area Network) type.

According to a particular embodiment, said network is of wireless ad-hoc type.

According to an embodiment, said network is of Bluetooth type.

According to another embodiment, said network is of WI-Fi type.

According to a variant, a communication device of said network is identified by a MAC (Media Access Control) address.

The present invention also relates to a method of communication in a communication network comprising at least two communication devices, characterized in that it comprises steps consisting in:
 storing for each (source, destination) pair of network devices, paths in the form of lists of (LD, EA) pairs, EA being the Earliest Arrival and LD being the Last Departure, for any sequence of contacts between devices, and transmitting data to another device by a node selected using the history of observed previous paths.

Preferably, said communication network is of packet-switching type, and said method comprises the steps consisting in:
 creating, for the (source, destination) pairs of said network, functions that provide, at each time, the earliest arrival time for each created packet, and
 representing these functions based on the sets of (LD, EA) pairs.

BRIEF DESCRIPTION OF THE DRAWINGS

The invention will be better understood from the following description of the invention provided as an example by referring to the annexed figures, wherein.

DETAILED DESCRIPTION OF THE EMBODIMENTS OF THE INVENTION

The method according to the present invention reduces the memory required to realize a calculation on large traces, or a calculation in real time.

Moreover, the method according to the present invention is the most compact representation of these optimal paths (2N numbers for N optimal paths). In addition, it automatically adapts to two situations:
- the coding convention used is well adapted for simultaneous paths,
- a very high degree of heterogeneity in path granularity (many paths in a few seconds, then long periods of time without any event).

The results of the invention can be used to make transmission decisions for a mobile terminal.

A sequence of edges forming a path in the graph topology is called admissible if a path respecting the time can be defined using the sequence of these contacts:

$(e_1, e_2, \ldots, e_n)$ where $e_i = (v_i, v_{i-1}, t_i^{beg}, t_i^{end})$ is admissible if a non-decreasing sequence of times exists $(t_1, \ldots, t_n)$ such that $t_i^{beg} \leq t_i \leq t_i^{end}$.

By induction, we obtain the fact that an equivalent condition is:

$$\forall i, t_i^{end} \geq \max\{t_j^{beg}; j<i\}. \quad (1)$$

The admissible sequences cannot always be concatenated, even if the last contact for a sequence is the first contact of the other. This is due to the fact that paths respecting the time for the first sequence can arrive after the paths respecting the time of the second one are already gone.

Figure 3:
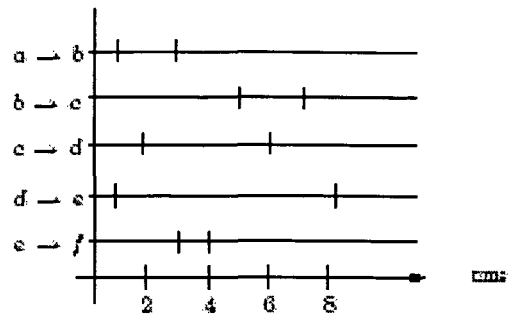
FIG. 3 illustrates an example of paths resecting the time, using the same contact, and that cannot be concatenated.

FIG. 3 illustrates an example of this case: the sequence ($e_1$, $e_2$, $e_3$, $e_4$) is admissible, because it can be associated with the sequence increasing in time (3, 5, 5, 5). Similarly, the sequence ($e_4$, $e_5$) can be associated with the time sequence (4, 4). However, ($e_1$, $e_2$, $e_3$, $e_4$, $e_5$) is not admissible, because it does not define paths respecting the time. On this FIG. 3, the first vertical short dash on each horizontal line represents the first contact and the second vertical dash on each horizontal line represents the end of the contact.

For any admissible sequence of contacts $e=(e_1, e_2, \ldots, e_n)$, the earliest arrival is defined: EA or Earliest Arrival:

$$EA(e) = \max_i \{t_i^{beg}\}.$$

Similarly, the last departure: LD or Last Departure is defined as $$LD(e) = \min_i \{t_i^{end}\}.$$

The following facts are simple to obtain. They show that the preceding definitions enable the general description of a large class of paths respecting the time, and manipulation of an admissible sequence.

(i) All the paths respecting the time associated with e leave the source before LD (e) and arrive after EA(e).
(ii) There are paths respecting the time associated with e that depart the source at the time LD(e) and that arrive at the time EA(e).
(iii) Two sequences (e), (e') of contacts such as $v_n = v'_0$ can be concatenated into a single admissible sequence $e \circ e'$ if and only if $EA(e) \leq LD(e')$.

Proposal (iii) is a simple and useful construct of the characterisation of admissible sequences (1) previously presented. It is simple to verify that $EA(e \circ e') = \max(EA(e), EA(e'))$ and that $LD(e \circ e') = \min(LD(e), LD(e'))$.

In (ii), it is not necessarily the same path that leaves the source at the time LD(e) and that arrives at the time EA(e).

Take for example a sequence e realized with a unique contact (a->b) for the time interval $[t^{beg}; t^{end}]$ with $t^{beg} < t^{end}$. A path respecting the time and using this contact goes from a->b at the time $t^{beg}$, a different path at the time $t^{end}$. However, when $LD(e) \leq EA(e)$, as is usually the case with multi-hop type paths, a path can be constructed departing at time LD(e) that arrives at time EA(e). Among all the paths respecting the time associated with this sequence, this one is optimal in the sense that it is more efficient than the others, in terms of delay.

A path respecting the time, leaving node a at time $t_{dep}$, arriving at node b at time $t_{arr}$, is called optimal if no other path exists that is strictly better in terms of departure/arrival time. In other words, another path starting afterwards necessarily arrives later, and another path arriving earlier must necessarily have started before.

$t'_{dep} > t_{dep} \Rightarrow t_{arr} > t_{arr}$ and $t'_{arr} < t_{arr} \Rightarrow t'_{dep} < t_{dep}$, where $t'_{dep}$, $t'_{arr}$ correspond to departure and arrival times of another path going from a to b.

Within a given subset of paths respecting the time, a path is called optimal for this subset if no other path of the subset is strictly better according to the definition given above.

As an example, the subset of all the paths associated with a sequence of contacts e can be considered. The optimal paths for this subset are characterized once (EA(e),LD(e)) is known. If $LD(e) \leq EA(e)$, then a path departing at time LD(e) can be constructed that arrives at time EA(e), as discussed above. It is optimal and all the optimal paths depart and arrive necessarily at the same time exactly.

If, conversely, EA(e)<LD(e), this results from the definitions that, all the intervals associated with contacts in e recognize an intersection on [EA(e);LD(e)]. The optimal paths that depart and arrive at every selected time t in this common interval can then be constructed. These are the only ones.

The arrival function is introduced, for each source a and destination b, that provides the earliest arrival of a message as a function of time where it can be sent by the source. This function is defined generally by:

$$del(t) = \min\{t_{arr}^{(\pi)}; t \leq t_{dep}^{(\pi)}\}$$

where $\pi$ represents all paths respecting the time, that can be drawn between a and b in the temporal graph. By convention, it is taken as infinite if no path exists. In this definition, the minimum can be restricted to include only optimal paths, without this modifying the value of the function.

The characteristics of optimal paths for a given sequence of contacts e are known explicitly and they are provided by EA(e), LD(e). The following expression of the arrival function can be deducted from that which precedes:

$$del(t) = \max(t, \min[EA(e)|t \leq LD(e)]), \quad (2)$$

where the minimum is taken from among all the admissible sequence of contacts, e, leading from the source to the destination.

In other words, all the values and discontinuities of the arrival function based on the sequence of admissible contacts can be described, that are constructed directly in the temporal graph. In addition, this function depends only on the pairs (EA,LD) associated with all these sequences.

Figure 1:
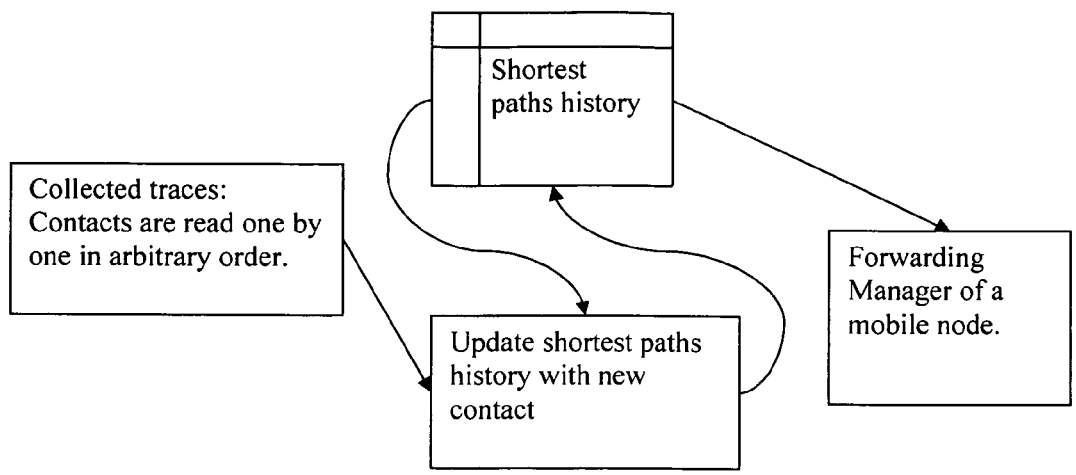
FIG. 1 illustrates the method according to the present invention.
Figure 2:
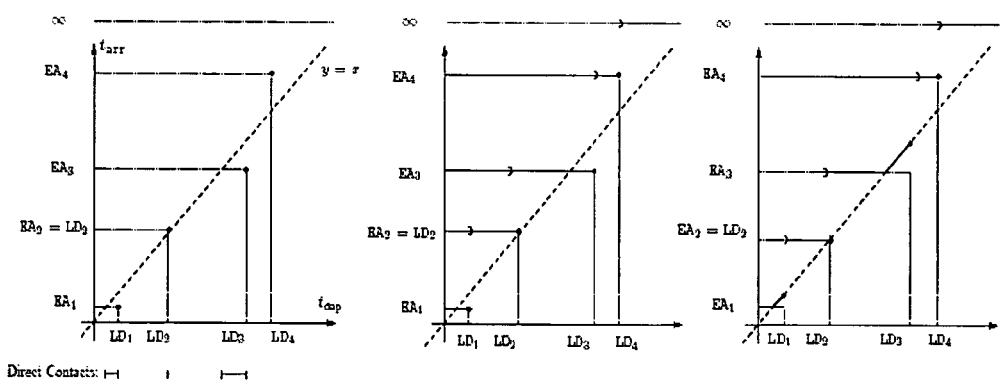
FIG. 2 is a chronological diagram that describes the optimal paths at each time, for a given (source destination) pair.

The arrival function and its representation by sequence of pairs, is illustrated by FIG. 2. The time t is represented on the x-axis and the value of the arrival function that can be infinite is represented on the y-axis. This schema is called a chronological diagram. The schema on the left shows the points with coordinates associated with pairs, that in the middle presents the value taken by the minimum in (2) and on the right, the arrival function is shown. Three complimentary cases are shown: the pairs 1 and 3 correspond to a simultaneous connectivity interval between the source and the destination, the pair 2 shows a similar case, where the contact lasts only for a time interval, the pair 4 does not correspond to a simultaneous connectivity, as the data must depart the source and remain for a moment in a relay before being delivered. Similar cases are encountered in practice.

In the algorithms presented, the arrival function is always shown, not directly as a function, but using its associated sequence of pairs (LD,EA). According to this representation, an empty collection corresponds naturally to a source-destination pair for which no path exists, and the arrival function is a constant of an always infinite value.

The method according to the present invention efficiently processes and shows the performance of all the optimal paths in a temporal graph, for all the source-destination pairs, at every departure time. These optimal paths correspond to the best possible transmission choice, based on opportunist contacts in a mobile network. As studying only the optimal paths can be too restrictive, it is shown that the same method enables identification of all the optimal paths within certain classes. The optimality notion can thus be parameterized.

The method according to the present invention constructs arrival functions for all the source-destination pairs by induction on the set of contacts, or edges of the temporal graph. The functions will be represented based on the pair sets (LD, EA).

Two remarks apply to each source-destination pair:

Many pairs (LD, EA) associated with admissible sequence are not required to characterize the arrival function given by (2). The function can be entirely characterized by a small number of pairs, that equals the number of discontinuities and the number of optimal paths for this source-destination pair.

If the pair set is organized in the form of a list, that is sorted according to the first coordinate, this list can be efficiently updated to include another pair (LD, EA) that captures the effect of another sequence of contacts.

Based on these techniques, two algorithms were developed:

1) Non restrictive search:

In order to capture the effect of all the optimal paths, the contacts in the temporal graph are added one after another. Starting from empty collections and a set of empty contacts, collections representing the arrival functions for the extended sub-graph are updated for each stage. When a contact, an a->b edge in the temporal graph is added, the associated pair (LD, EA) is initially included in the collection corresponding to the source a and to the destination b. To represent all the paths that can pass by this edge in a new optimal path, all the collections with a source s and a destination a, and the collections with a source b and all the destinations d are examined. There is no need to consider all the pairs (LD, EA) in these collections. Some among them may not be completed with the new edge in an admissible sequence, according to the concatenation rule previously presented, others do not result in the definition of new optimal paths.

All of these operations (concatenation, optimality, inclusion in an existing arrival function) can be decided on the base of values of associated pairs (LD, EA). After all these contacts have been included, the best arrival function is obtained, which particularly describes the characteristics of optimal path delay seen at each time.

Figure 5:
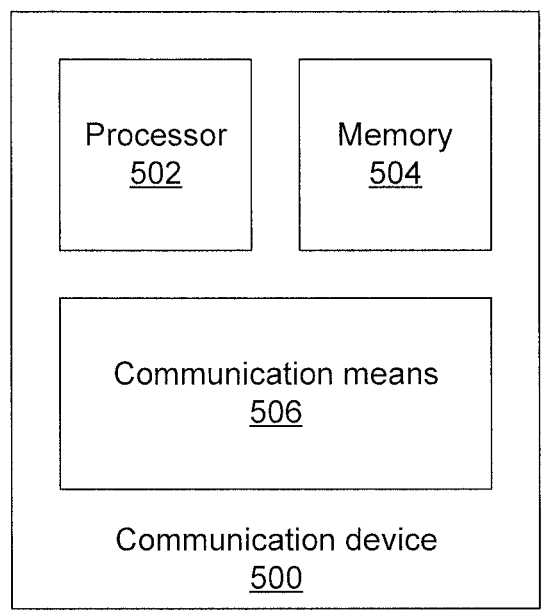
FIG. 5 shows a communication device.

2) Search with limited hops:

In this algorithm, a unique concatenation is iterated to the right of all the contacts with the same set of fixed references. It is started with an empty set, so that the first iteration produces all the size 1 optimal paths (as each direct contact between two terminals is in fact an optimal path). In the following step, the set of these paths is considered as the new reference set, and each contact is again concatenated with this set, without modification. The results are joined together to obtain all the optimal paths with a size of at least two. Conserving the first set of paths in the memory is then unnecessary for the following stages. p Referring now to FIG. 5, an exemplary communication device is shown. According to the present invention, the communication device 500 is typically a mobile terminal comprising a processor 502, a memory 504 and means of communication 506 capable of communication with other communication devices.

The method distributed according to the present invention calculates a posteriori the paths presenting an optimal delay from each source to each destination.

In an embodiment, this method comprises two components:

a backward-routing that is an exact calculation of information concerning the optimal delay paths up to the present, and a transmission based on an event log, that is a mechanism charged with the extraction of past information to make a transmission decision.

Backward-Routing:

In this part, a network current state in terms of past opportunities of all sources towards itself is maintained.

Each network node is now in a backward-routing table, the last optimal delay path of all the sources s towards itself. This path is defined like that which enables a packet to depart at the last possible time of s and to arrive at the node before the current time t.

All tables are initially empty. When two nodes arrive in contact, the exchange the content of their tables in such a way to update their states to represent this contact. This also enables each node to be informed of the presence of other sources.

It may seem excessive to capture information concerning all the network sources, as a node may not be particularly interested by another node. However, carrying out a selection per node will have an impact on the path from a source towards this particular destination and this will also eliminate all the paths that could use this destination as a relay to exchange data.

When two nodes encounter each other repeatedly, it is possible to avoid the exchange of redundant inputs.

History-Based Forwarding

Initially, information is extracted from backward routing tables in a state of constant evolution: statistics can be collected concerning those which had been a relay for the optimal delay paths.

Secondly, the information is used to carry out the transmission of data packets.

Figure 4:
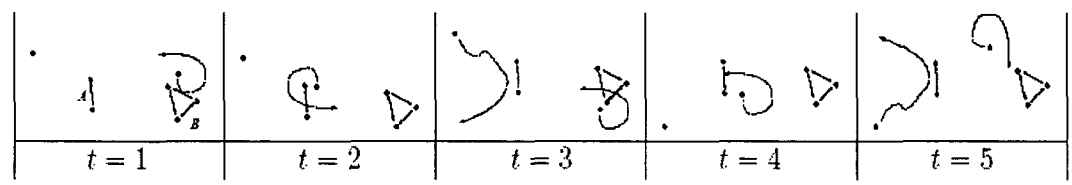
FIG. 4 shows a scenario example for a mobile network.

FIG. 4 shows a scenario with seven nodes. Five nodes are static during this period: they are distributed in two clusters A and B respectively containing two and three nodes. Two nodes are in motion in different regions. One of the two, in particular, enters into contact with the two static clusters at several different times.

The backward-routing stage presented above operates as follows in this example:

At the time t=1, the backward-routing tables contain only static nodes and the mobile nodes contain paths from all the nodes of cluster B.

At the time t=2, the mobile nodes in the middle enter into contact with the other cluster. It transmits thus by transitivity an optimal delay path from all the nodes in cluster B to all the nodes in cluster A. This is immediately reflected by the node in cluster A.

At the time t=3, the mobile nodes in contact with B update all their paths at departure from this cluster, and create new paths from all the nodes of cluster A at the time t=2, to the nodes of cluster B. In addition, the node farthest on the left enters into contact with the nodes of cluster A: it inherits the paths of the entire cluster A with a departure time equal to t=3, and the paths of cluster B with a departure time t=1.

At the time t=4, the mobile node repeats a second contact in A. It updates all the paths and obtains for the first time an input corresponding to the mobile node furthest on the left.

At the time t=5, each mobile node enters into contact with a cluster, in particular the cluster B. This cluster comprises for the first time a path initiated from the mobile node furthest on the left.

At that moment, the network is connected, that is a path has been found for all the pairs (source, destination).

Certain operations based on the history can make the transmission more efficient.

If a packet created at the level of the mobile node furthest on the left must be sent to cluster B, it can decide, based on the contact carried out at time t=3, to leave a copy in cluster A, because it has seen for the first time a path of B to itself, passing via A. In fact, following the same rule, the nodes of cluster A give the packet to the mobile node at the middle of time t=4, that then give it to the destination at the time t=5.

Very rapidly, the nodes of the two clusters can identify that the mobile node at the middle is a good option for the transmission of packets to the other cluster.

Backward-Routing Table Format

Two fields are necessary for each entry: the source (identified by the MAC address or by another unique signature), and the time that was identified as the last departure from this source. This information is sufficient to maintain the table in an updated state, but this does not enable selection of one or more particular relays, as only the distance (or delay of the optimal path) between each source and a node is described.

Another field can be added. It can contain, for example:
the identity of the last transmitter,
the complete list of relays in a path,
the time when the path was recorded (corresponding to the last contact used by this path),
the list of relays used and the transition time between them, for this path.

An example table is provided in the following table:

TABLE 1

Example of a backward-routing table.

| Sources | Last departure | Paths descriptions (optional) |
|---|---|---|
| 1 | 1 | By 5, at the time 3, information collected at the time 3 |
| ... | ... | ... |
| N | 6 | By N, at the time 6 |

The table is empty initially. When i and j meet, they initially initialise or update the entry relating to one or other.

TABLE 2

| Sources | Last departure | Paths |
|---|---|---|
| i | t | Via i to t |

Secondly, they exchange their current backward-routing tables. When a node receives a new entry, for a source s and a last departure t':
if there is no entry for this source, it adds it to its table:
if there is already an entry for this source, it compares the time of the last departure and updates it with the highest value.

When an entry is initialised or updated, the information concerning the path used is concatenated with that received.

It is possible to restrict the number of entries exchanged, for example by not sending certain entries.

The invention is described in the preceding text as an example. It is understood that those skilled in the art are capable of producing variants of the invention without leaving the scope of the patent.

The invention claimed is:

1. A communication device, in a communication network comprising at least two communication devices, comprising:
means for storing, for each pair of source and destination communication devices of said communication network, sequences of chronologically ordered contacts between pairs of communication devices linking the source communication device and the destination communication device, called paths, in the form of lists of (LD, EA) pairs, where EA is an Earliest Arrival time to a first communication device and LD is a Last Departure time from a second communication device for any sequence of contacts, so that for each of said paths from the source to the destination communication devices, the LD associated to each of said paths corresponds to the last time a path can begin and the EA associated to each of said paths corresponds to the first time a path can end,
means for maintaining, for each node of the network, a backward routing table containing information about previous observed paths from all the source communication devices in the network towards said node; and
means for transmitting data to another communication device by a node selected using a history of previous observed paths extracted from the backward routing tables.

2. The communication device according to claim 1, wherein said communication network is of a packet-switching type, and in that said communication device comprises:
means for creating, for the source and destination pairs of said communication network, functions that provide, at each time, an earliest arrival time for each created packet, and
means for representing these functions based on the lists of (LD, EA) pairs.

3. The communication device according to claim 1 wherein said communication network is a PAN (Personal Area Network) type.

4. The communication device according to claim 3 wherein said communication network is of a Bluetooth type.

5. The communication device according to claim 1 wherein said communication network is of a wireless ad-hoc type.

6. The communication device according to claim 1 wherein said communication network is of a Wi-Fi type.

7. The communication device according to claim 1, wherein a communication device of said communication network is identified by a MAC (Media Access Control) address.

8. The communication device of claim 1, wherein each pair of subsequent nodes in a path list has overlapping ranges defined by the nodes' respective (LD, EA) pairs.

9. A method of communication in a communication network comprising at least two communication devices, comprising steps of:

storing for each pair of source and destination communication devices of said communication network, sequences of chronologically ordered contacts between pairs of communication devices linking the source communication device and the destination communication device, called paths, in the form of lists of (LD, EA) pairs, where EA is an Earliest Arrival time to a first communication device and LD is a Last Departure time from a second communication device, for any sequence of contacts, so that for each of said paths from the source to the destination communication devices, the LD associated to each of said paths corresponds to the last time a path can begin and the EA associated to each of said paths corresponds to the first time a path can end, maintaining, for each node of the network, a backward routing table containing information about previous observed paths from all the source communication devices in the network towards said node; and transmitting data to another communication device by a node selected using a history of previous observed paths extracted from the backward routing tables.

10. The method of communication according to claim 9, wherein said communication network is of a packet-switching type, in that it comprises steps consisting in:

creating, for the source and destination pairs of said communication network, functions that provide, at each time, an earliest arrival time for each created packet, and representing these functions based on the lists of (LD, EA) pairs.

11. The method of claim 9, wherein each pair of subsequent nodes in a path list has overlapping ranges defined by the nodes' respective (LD, EA) pairs.

* * * * *